(12) United States Patent
Shih et al.

(10) Patent No.: US 9,866,474 B2
(45) Date of Patent: Jan. 9, 2018

(54) CENTRALIZED SERVER SWITCH MANAGEMENT

(71) Applicant: Quanta Computer Inc., Taoyuan (TW)

(72) Inventors: Ching-Chih Shih, Taoyuan (TW); Lu-Fong Weng, Taoyuan (TW)

(73) Assignee: QUANTA COMPUTER INC., Taoyuan (TW)

(*) Notice: Subject to any disclaimer, the term of this patent is extended or adjusted under 35 U.S.C. 154(b) by 93 days.

(21) Appl. No.: 14/955,437

(22) Filed: Dec. 1, 2015

(65) Prior Publication Data

US 2017/0155579 A1    Jun. 1, 2017

(51) Int. Cl.
| | |
|---|---|
| *H04L 12/753* | (2013.01) |
| *H04L 12/44* | (2006.01) |
| *H04L 12/24* | (2006.01) |
| *H04L 12/947* | (2013.01) |
| *H04L 12/931* | (2013.01) |

(52) U.S. Cl.
CPC .............. *H04L 45/48* (2013.01); *H04L 12/44* (2013.01); *H04L 41/044* (2013.01); *H04L 49/25* (2013.01); *H04L 49/35* (2013.01)

(58) Field of Classification Search
CPC ..... H04L 12/00; H04L 12/24; H04L 12/5696; H04L 12/4641; H04L 49/10; H04L 49/15; H04L 49/35; H04L 49/70; H04L 2012/5617
See application file for complete search history.

(56) References Cited

U.S. PATENT DOCUMENTS

| | | | | |
|---|---|---|---|---|
| 9,374,270 B2* | 6/2016 | Nakil | .................. | H04L 41/0668 |
| 2010/0097934 A1* | 4/2010 | Hendel | .................... | H04L 45/04 |
| | | | | 370/237 |
| 2014/0269415 A1* | 9/2014 | Banavalikar | .......... | H04L 12/185 |
| | | | | 370/254 |
| 2016/0021032 A1* | 1/2016 | Maier | ..................... | H04L 49/70 |
| | | | | 370/401 |
| 2016/0103696 A1* | 4/2016 | Nataraja | ............. | G06F 9/45558 |
| | | | | 718/1 |
| 2016/0117282 A1* | 4/2016 | Hutchison | ........... | G06F 13/4221 |
| | | | | 710/110 |
| 2016/0142269 A1* | 5/2016 | Konduru | ............... | H04L 43/026 |
| | | | | 709/224 |
| 2016/0205023 A1* | 7/2016 | Janardhanan | ........... | H04L 47/22 |
| | | | | 370/230.1 |
| 2016/0259661 A1* | 9/2016 | Tasoulas | ............. | G06F 9/45558 |
| 2016/0335216 A1* | 11/2016 | Krishnan | ............ | G06F 13/4027 |
| 2017/0155579 A1* | 6/2017 | Shih | ........................ | H04L 12/44 |

FOREIGN PATENT DOCUMENTS

TW                201324182 A         6/2013

OTHER PUBLICATIONS

Taiwanese Office Action 105101406 dated Sep. 8, 2016 w/ English First Office Action Summary.

* cited by examiner

*Primary Examiner* — Benjamin H Elliott, IV

(74) *Attorney, Agent, or Firm* — Nixon Peabody LLP; Eduardo J. Quinones; Zhou Lu

(57) ABSTRACT

A system for managing server switches includes a plurality of leaf switches, a plurality of spine switches connected to each of the plurality of leaf switches, and a switch manager. The switch manager is connected to the plurality of leaf switches and the plurality of spine switches, and is configured to provide an individual controller as a virtual machine for each leaf switch and for each spine switch.

15 Claims, 5 Drawing Sheets

CENTRALIZED SERVER SWITCH MANAGEMENT

BACKGROUND

Field

This application relates to networked computer systems, and more particularly to a system and method for managing server switches.

Background

Computer server systems in modern data centers are commonly mounted in specific configurations on server racks for which a number of computing modules, such as server trays, server chassis, server sleds, server blades, etc., are positioned and stacked relative on top of each other within the server racks. Rack mounted systems allow for vertical arrangement of the computing modules to use space efficiently. Generally, each computing module can slide into and out of the server rack, and various cables such as input/output (IO) cables, network cables, power cables, etc., connect to the computing modules at the front or rear of the rack. Each computing module contains one or more computer servers or may hold one or more computer server components. For example computing modules includes hardware circuitry for processing, storage, network controllers, disk drives, cable ports, power supplies, etc.

Each computing module can be connected to a network such as an Ethernet network. Ethernet has been the most widely used networking standard for connecting computers in both Local Area Networks (LANs) and Wide Area Networks (WANs). Ethernet devices communicate by transmitting data packets, which comprise blocks of data that are individually sent and delivered. Ethernet defines a number of wiring and signaling standards for the physical layer (PHY), through means of network access at the Data Link Layer, and through a common addressing format.

SUMMARY

The following presents a simplified summary of one or more embodiments in order to provide a basic understanding of present technology. This summary is not an extensive overview of all contemplated embodiments of the present technology, and is intended to neither identify key or critical elements of all examples nor delineate the scope of any or all aspects of the present technology. Its sole purpose is to present some concepts of one or more examples in a simplified form as a prelude to the more detailed description that is presented later.

In some implementations, a system for managing server switches includes a plurality of leaf switches, a plurality of spine switches connected to each of the plurality of leaf switches, and a switch manager. The switch manager is connected to the plurality of leaf switches and the plurality of spine switches, and is configured to provide an individual controller as a virtual machine for each leaf switch and for each spine switch.

In some implementations, a method includes connecting a plurality of leaf switches to a switch manager and connecting a plurality of spine switches to the switch manager. The method further includes running, on the switch manager, an emulation of a first controller to manage each leaf switch and an emulation of a second controller to manage each spine switch.

In some implementations, a network system includes a plurality of leaf switches, a plurality of spine switches connected to each of the plurality of leaf switches, and a controller in communication with the plurality of leaf switches and the plurality of spine switches. The controller stores instructions which, when executed, cause the controller to provide an individual controller as a virtual machine for each leaf switch and for each spine switch.

BRIEF DESCRIPTION OF THE DRAWINGS

These and other sample aspects of the present technology will be described in the detailed description and the appended claims that follow, and in the accompanying drawings, wherein:

DETAILED DESCRIPTION

The subject disclosure provides techniques for managing server switches. Various aspects of the present technology are described with reference to the drawings. In the following description, for purposes of explanation, numerous specific details are set forth in order to provide a thorough understanding of one or more aspects. It is evident, however, that the present technology can be practiced without these specific details. In other instances, well-known structures and devices are shown in block diagram form in order to facilitate describing these aspects.

A large number of network cables are coupled to the computing modules mounted on each server rack. Typically the network cables are routed in an organized manner behind each server rack. However, when a large number of network cables are connected to computing modules in the rack, cooling airflow is obstructed and computing modules can overheat and fail.

Various technologies are used to reduce the complexity of data center network cabling. An example network cabling topology, known as a leaf-spine network topology, uses a two tier switch architecture including "leaf" switches that each connect to multiple servers in a rack and "spine" switches that each connect to multiple leaf switches.

Figure 1:
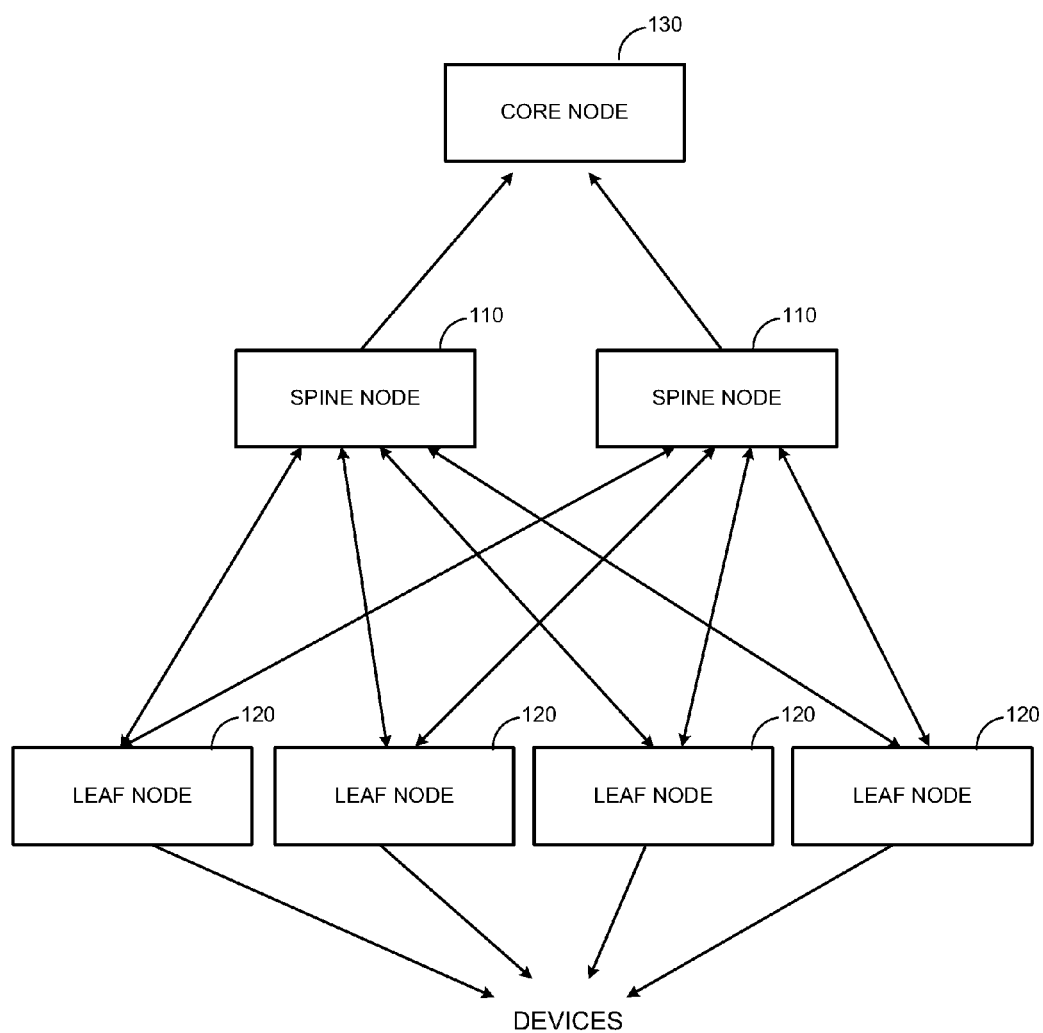
FIG. 1 illustrates an example of leaf-spine network topology.

FIG. 1 illustrates an example of leaf-spine network topology 100. Multiple leaf nodes 120 make up a first tier (i.e., leaf layer) of the leaf-spine network topology 100. One or more spine nodes 110 make up a second tier (i.e., spine layer) of the leaf-spine network topology 100. Each leaf node 120 and each spine node 110 includes a network switch. One or more core nodes 130 make up a third tier above the spine layer. The various leaf nodes 120 connect to other network devices, such as servers, firewalls, load balancers, and edge routers, etc.

A network switch (e.g., an Ethernet switch) is a device used on a computer network to physically connect devices together. Multiple cables are connected to a switch to enable networked devices to communicate with each other. Switches manage the flow of data across a network by only transmitting a received message to the device for which the message was intended. Each networked device connected to a switch is identified using a media access control (MAC) address, allowing the switch to regulate the flow of traffic.

Switches include application specific integrated circuits (ASICs) to build and maintain MAC address tables.

With leaf-spine configurations, all devices, each connected to a leaf node 120, are the same number of paths away from each other and have a predictable and consistent amount of delay or latency for traveling information. The leaf layer includes leaf nodes, each including a leaf switch that connects to devices. The spine layer includes spine nodes, each including a spine switch, is the backbone of the network, where every leaf node is interconnected with each and every spine node.

Figure 2:
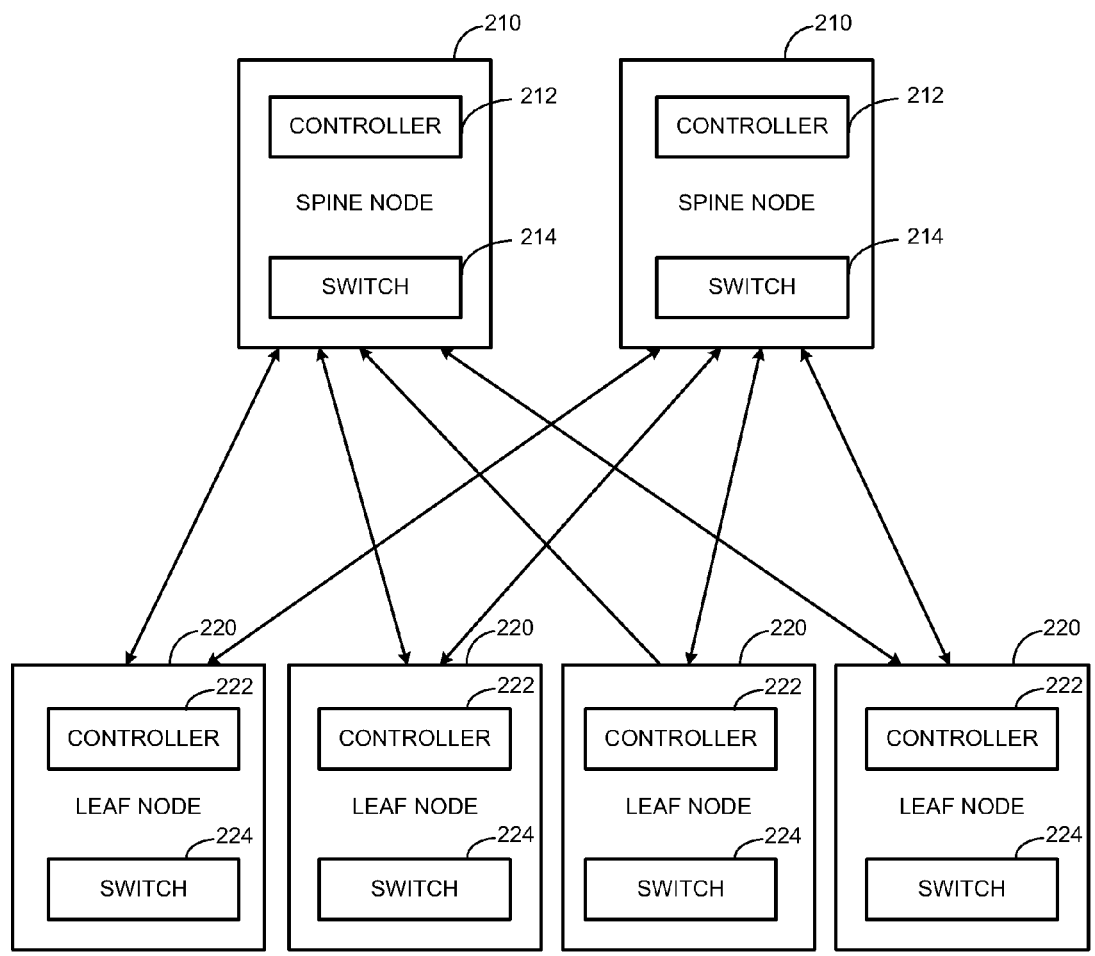
FIG. 2 illustrates an example leaf-spine network architecture for managing server switches in the prior art.

FIG. 2 illustrates an example leaf-spine network architecture 200 for managing server switches in the prior art. The example leaf-spine network architecture 200 includes one or more spine nodes 210 and one or more leaf nodes 220. Each leaf node 220 connects to each and every spine node 210.

In some implementations, the leaf nodes 220 connects to the spine nodes 210 using high speed Ethernet. An example type of high speed Ethernet is 40GBASE-KR4 or 40G K4, which uses four lanes delivering serialized data at a rate of 10.3125 Gigabit/second per lane.

Each leaf node 220 includes a leaf switch 224 and a controller 224 that runs an operating system (OS) to manage the leaf switch 222. Similarly, each spine node includes a spine switch 214 and a controller 212 that runs an operating system (OS) to manage the spine switch 214. For example, each controller 222 in each leaf node 220 and each controller 212 in each spine node 210 includes a central processing unit (CPU), memory, and storage. The controller connects to the switch in each leaf node or spine node using Peripheral Component Interconnect Express (PCIe) or the like. PCIe uses point-to-point topology, with separate serial links connecting every device to a host. PCIe communication is encapsulated in packets.

In this leaf-spine network architecture each controller and OS running on the controller of the leaf nodes 220 are substantially identical. Similarly, each controller and OS running on the controller of the spine nodes 210 is substantially identical. This allows for easy addition or removal of leaf nodes and spine nodes into the leaf-spine network architecture 200.

Figure 3:
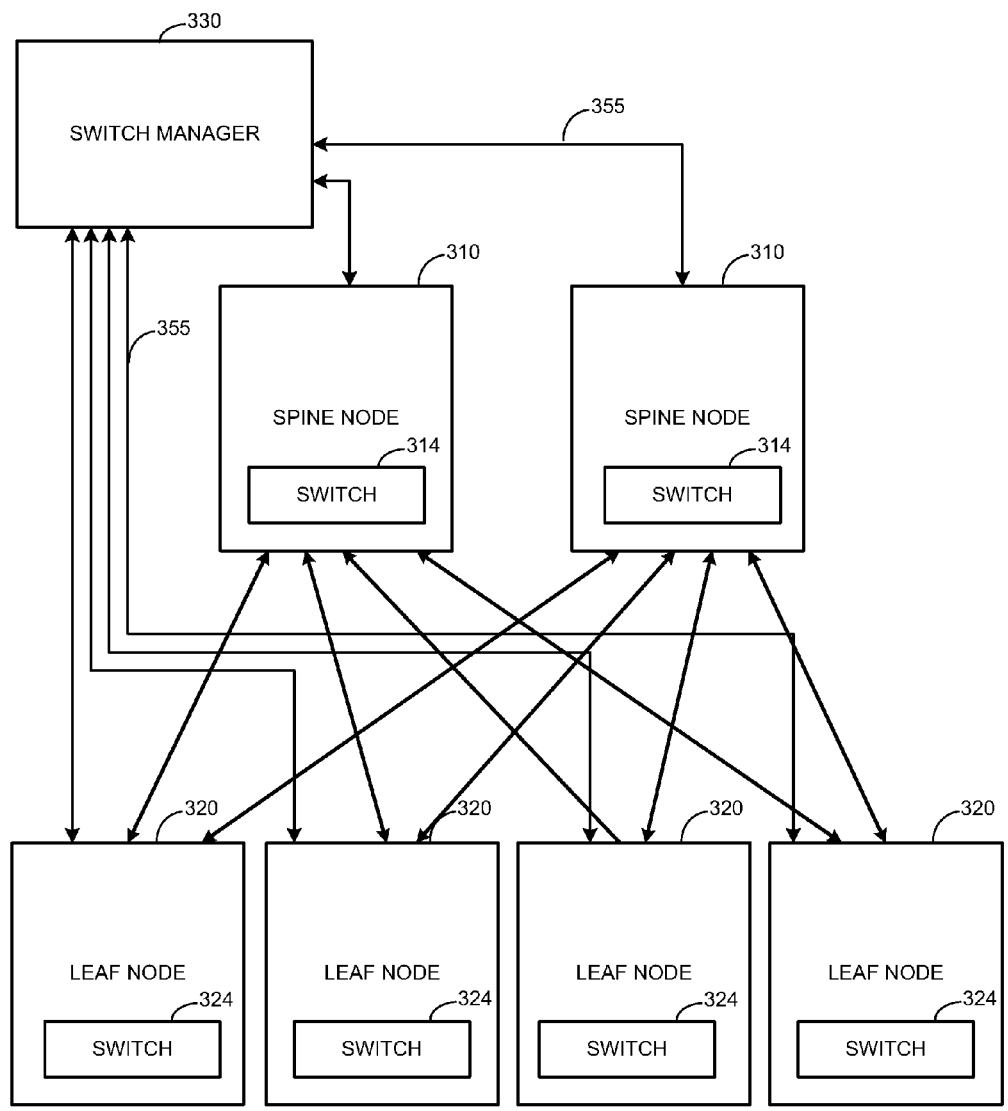
FIG. 3 illustrates another example leaf-spine network architecture for managing server switches in the prior art.

FIG. 3 illustrates another example of a leaf-spine network architecture 300 for managing server switches in the prior art. The leaf-spine network architecture 300 includes one or more spine nodes 310 and one or more leaf nodes 320. Each leaf node 320 connects to each and every spine node 310. In some implementations, the leaf nodes 220 connect to the spine nodes 210 using Gigabit Ethernet (e.g., 100 Gigabit Ethernet, 40 Gigabit Ethernet, etc.).

The leaf-spine network topology 300 also includes a switch manager 330 individually connected 355 to each spine node 310 and to each leaf node 320 using PCI, PCIe, or the like.

Each leaf node 320 and spine node 310 does not need to include an individual controller like the leaf-spine network architecture 200 of FIG. 2. Instead, every leaf node 320 and spine node 310 connects to a centralized switch manager 330 that runs a single OS. The centralized switch manager 330 includes a CPU, memory, and storage. In this leaf-spine network architecture, the single centralized switch manager 330 manages all leaf nodes 320 and spine nodes 310 while running a single OS. However, the OS may need to be customized specifically for each implementation of the leaf-spine network architecture 300. This leaf-spine network architecture 300 may make more difficult the addition or removal of leaf nodes 320 and spine nodes 310 than example leaf-spine network architecture 200 of FIG. 2. However, the leaf-spine network architecture 300 is less costly on hardware due to including only a single centralized switch manager 330.

Figure 4:
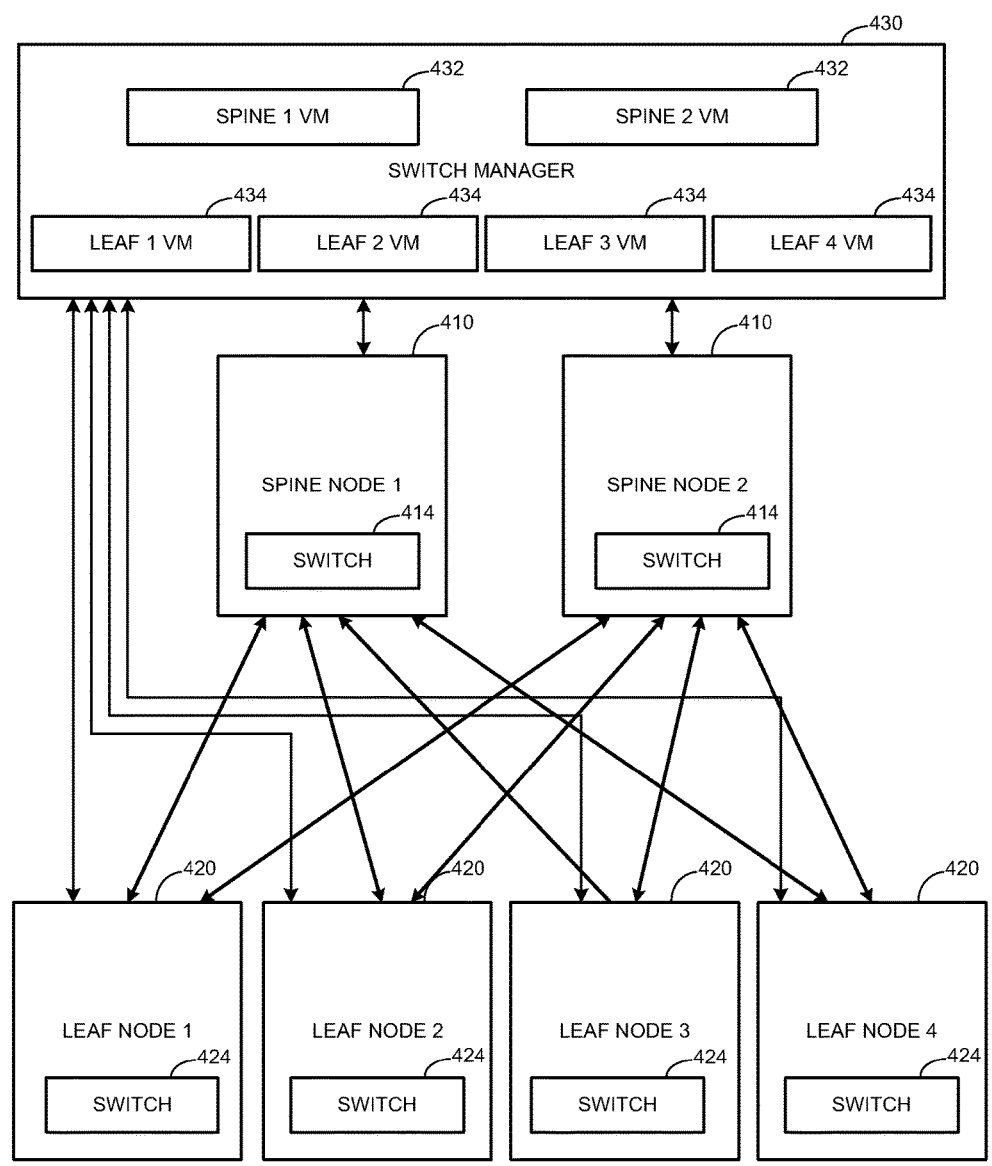
FIG. 4 illustrates an example leaf-spine network architecture for managing server switches.

FIG. 4 illustrates an example leaf-spine network architecture 400 for managing server switches. The leaf-spine network architecture 400 combines the low hardware costs of the ease of expandability of the architecture 200 of FIG. 2 with the lower hardware costs of the architecture 300 of FIG. 3.

The example leaf-spine network architecture 400 includes one or more spine nodes 410 and one or more leaf nodes 420. Each leaf node 420 connects to each and every spine node 410. In some implementations, the leaf nodes 220 connect to the spine nodes 210 using high speed Ethernet.

The leaf-spine network topology 400 also includes a switch manager 430 individually connected 455 to each spine node 410 and to each leaf node 420 using PCI, PCIe, or the like.

Each leaf node 420 and spine node 410 does not need to include an individual controller like the example leaf-spine network architecture 200 of FIG. 2. Instead, every leaf node 420 and each spine node 410 connects to a centralized switch manager 430.

The centralized switch manager 430 includes a CPU, memory, and storage. In this leaf-spine network architecture, an individual centralized switch manager 430 manages multiple leaf nodes 420 and multiple spine nodes 410. The centralized switch manager 430 emulates a number of individual controllers, one controller for each leaf node 420 or spine node 410. Each leaf node 420 and spine node 410 thus acts as if it has its own individual controller as in FIG. 2, yet for which individual controllers are not provided. Rather, each emulated controller is a virtual machine (VM)—an emulation of a particular computer system. VMs operate based on the computer architecture and functions of a real or hypothetical computer, and their implementations may involve specialized hardware, software, or a combination of both. Each VM runs an individual and separate OS from every other VM. In this manner multiple VMs are emulated using a single computer (i.e., the centralized switch manager 430). In some implementations, a virtual machine manager (sometimes referred to as a hypervisor) launches an OS on each of the VMs.

For example, the centralized switch manager 430 emulates a controller (leaf 1 VM) to manage a first leaf node (leaf node 1), a second controller (leaf 2 VM) to manage a second leaf node (leaf node 2), a third controller (leaf 3 VM) to manage a third leaf node (leaf node 3), and a fourth controller (leaf 4 VM) to manage a fourth leaf node (leaf node 4). The centralized switch manager 430 also emulates a fifth controller (spine 1 VM) to manage a first spine node (spine node 1) and a sixth controller (spine 2 VM) to manage a second spine node (spine node 2). In some implementations, an input/output direct assignment technology, such as the Intel Virtualization Technology Directed I/O (Intel VT-d), is used to assign each leaf switch 424 and each spine switch 414 to a corresponding VM.

Each of the controllers 434 for managing leaf nodes 420 runs the same OS as would the controller 222 from the architecture 200 of FIG. 2. Similarly, each of the controllers 432 for managing spine nodes 410 reuse the same OS as would the controller 212 from the architecture 200 of FIG. 2. In this manner, new software (e.g., OS of each VM) does not need to be created.

Figure 5:
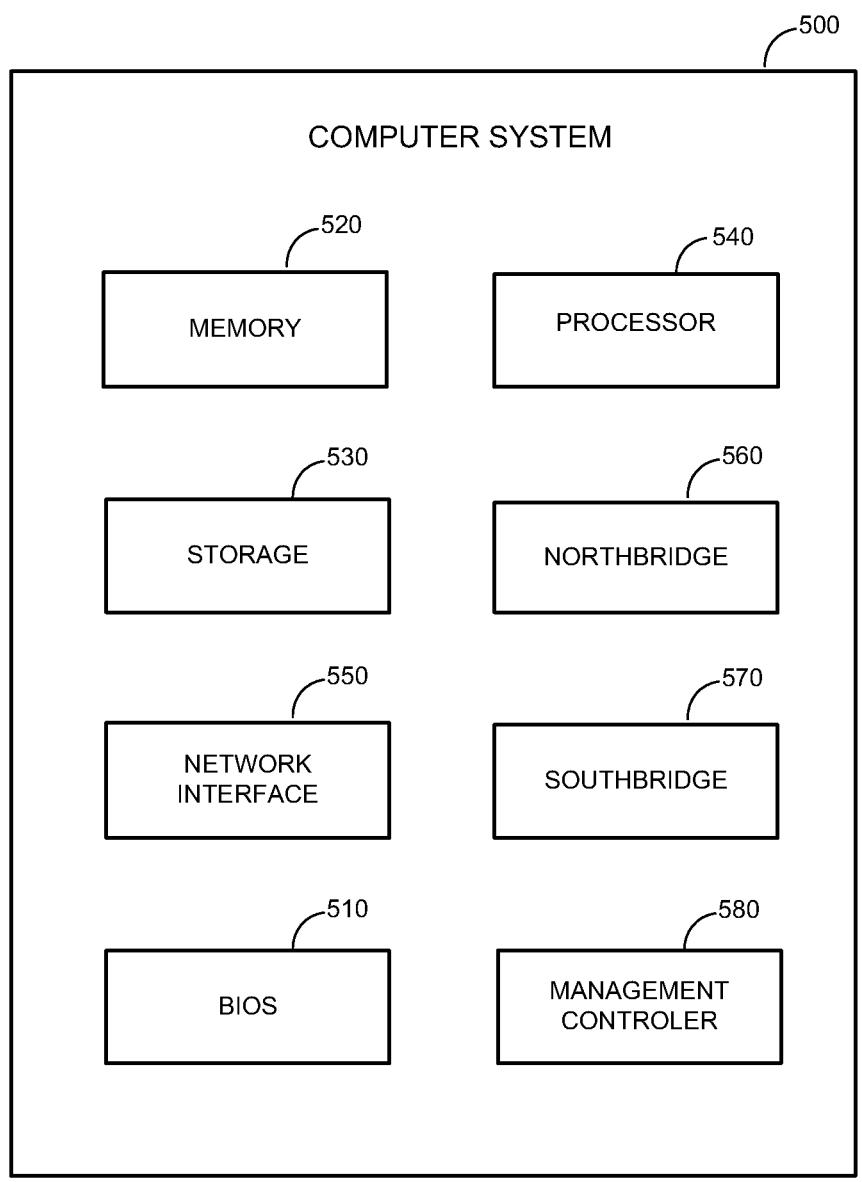
FIG. 5 illustrates a block diagram of an example computer system.

FIG. 5 illustrates a block diagram of an example computer system 500. A computer system of the subject disclosure can be any of various central processing unit (CPU) architectures such as x86, Acorn RISC Machine (ARM), Microprocessor without Interlocked Pipeline Stages (MIPS), etc. The example computer system 500 has an x86 CPU architecture. The computer system 500 includes a processor 540, a network interface 550, a management controller 580, a memory 520, a storage 530, a BIOS 510, a northbridge 560, and a southbridge 570.

The computer system 500 is, for example, a server (e.g., a server in a server rack of a data center) or a personal computer. The processor (e.g., central processing unit (CPU)) 540 is a chip on a motherboard that retrieves and executes programming instructions stored in the memory 520. The processor 540 is a single CPU with a single processing core, a single CPU with multiple processing cores, or multiple CPUs. One or more buses (not shown) transmit instructions and application data between various computer components such as the processor 540, memory 520, storage 530, and networking interface 550.

The memory 520 includes any physical device used to temporarily or permanently store data or programs, such as various forms of random-access memory (RAM). The storage 530 includes any physical device for non-volatile data storage such as a HDD or a flash drive. The storage 530 can have a greater capacity than the memory 520 and can be more economical per unit of storage, but can also have slower transfer rates.

The BIOS 510 includes a Basic Input/Output System or its successors or equivalents, such as an Extensible Firmware Interface (EFI) or Unified Extensible Firmware Interface (UEFI). The BIOS 510 includes a BIOS chip located on a motherboard of the computer system 500 storing a BIOS software program. The BIOS 510 stores firmware executed when the computer system is first powered on along with a set of configurations specified for the BIOS 510. The BIOS firmware and BIOS configurations are stored in a non-volatile memory (e.g., NVRAM) or a ROM such as flash memory. Flash memory is a non-volatile computer storage medium that can be electronically erased and reprogrammed.

The BIOS 510 is loaded and executed as a sequence program each time the computer system 500 is started. The BIOS 510 recognizes, initializes, and tests hardware present in a given computing system based on the set of configurations. The BIOS 510 performs self-test, such as a Power-on-Self-Test (POST), on the computer system 500. This self-test tests functionality of various hardware components such as hard disk drives, optical reading devices, cooling devices, memory modules, expansion cards and the like. The BIOS addresses and allocates an area in the memory 520 in to store an operating system. The BIOS 510 then gives control of the computer system to the OS.

The BIOS 510 of the computer system 500 includes a BIOS configuration that defines how the BIOS 510 controls various hardware components in the computer system 500. The BIOS configuration determines the order in which the various hardware components in the computer system 500 are started. The BIOS 510 provides an interface (e.g., BIOS setup utility) that allows a variety of different parameters to be set, which can be different from parameters in a BIOS default configuration. For example, a user (e.g., an administrator) can use the BIOS 510 to specify clock and bus speeds, specify what peripherals are attached to the computer system, specify monitoring of health (e.g., fan speeds and CPU temperature limits), and specify a variety of other parameters that affect overall performance and power usage of the computer system.

The management controller 580 is a specialized microcontroller embedded on the motherboard of the computer system. For example, the management controller 580 is a baseboard management controller (BMC). The management controller 580 manages the interface between system management software and platform hardware. Different types of sensors built into the computer system report to the management controller 580 on parameters such as temperature, cooling fan speeds, power status, operating system status, etc. The management controller 580 monitors the sensors and has the ability to send alerts to an administrator via the network interface 550 if any of the parameters do not stay within preset limits, indicating a potential failure of the system. The administrator can remotely communicate with the management controller 580 to take some corrective action such as resetting or power cycling the system to restore functionality.

The northbridge 560 is a chip on the motherboard that can be directly connected to the processor 540 or is integrated into the processor 540. In some instances, the northbridge 560 and the southbridge 570 is combined into a single die. The northbridge 560 and the southbridge 570, manage communications between the processor 540 and other parts of the motherboard. The northbridge 560 manages tasks that require higher performance than the southbridge 570. The northbridge 560 manages communications between the processor 540, the memory 520, and video controllers (not shown). In some instances, the northbridge 560 includes a video controller.

The southbridge 570 is a chip on the motherboard connected to the northbridge 560, but unlike the northbridge 560, need not be directly connected to the processor 540. The southbridge 570 manages input/output functions, such as Universal Serial Bus (USB), audio, serial, BIOS, Serial Advanced Technology Attachment (SATA), Peripheral Component Interconnect (PCI) bus, PCI eXtended (PCI-X) bus, PCI Express bus, ISA bus, SPI bus, eSPI bus, SMBus, of the computer system 500. The southbridge 570 connects to or includes within the southbridge 570 the management controller 570, Direct Memory Access (DMAs) controllers, Programmable Interrupt Controllers (PICs), and a real-time clock. In some instances, the southbridge 570 directly connects to the processor 540, such as in the case where the northbridge 560 is integrated into the processor 540.

The networking interface 550 is any interface that supports wired or wireless Local Area Networks (LANs) or Wide Area Networks (WANs), such as Ethernet, Fibre Channel, Wi-Fi, Bluetooth, Firewire, the Internet, etc. For example, the networking interface 50 can include a network interface controller (NIC) for Ethernet. Ethernet has been the most widely used networking standard for connecting computers in both Local Area Networks (LANs) and Wide Area Networks (WANs). Ethernet defines a number of wiring and signaling standards for the physical layer (PHY), through means of network access at the Media Access Control (MAC)/Data Link Layer, and through a common addressing format. Ethernet enabled devices typically communicate by transmitting data packets, which comprise blocks of data that are individually sent and delivered.

The various illustrative logical blocks, modules, and circuits described in connection with the disclosure herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor is a microprocessor, or in the alternative, any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor reads information from, and write information to, the storage medium. In the alternative, the storage medium is integral to the processor. The processor and the storage medium resides in an ASIC. The ASIC resides in a user terminal. In the alternative, the processor and the storage medium resides as discrete components in a user terminal.

In one or more exemplary designs, the functions described is implemented in hardware, software, firmware, or any combination thereof. If implemented in software, the functions are stored on or transmitted over as one or more instructions or code on a non-transitory computer-readable medium. Non-transitory computer-readable media includes both computer storage media and communication media including any medium that facilitates transfer of a computer program from one place to another. A storage media is any available media that can be accessed by a general purpose or special purpose computer. By way of example, and not limitation, such computer-readable media includes RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of non-transitory computer-readable media.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but is to be accorded the widest scope consistent with the principles and novel features disclosed herein.

The invention claimed is:

1. A system for managing server switches, comprising:
   a plurality of leaf switches;
   a plurality of spine switches connected to each of the plurality of leaf switches; and
   a switch manager connected to the plurality of leaf switches and the plurality of spine switches, the switch manager configured to emulate a plurality of individual controllers, each of the plurality of leaf switches corresponding to one of the plurality of individual controllers and each of the plurality of spine switches corresponding to another one of the plurality of individual controllers.

2. The system of claim 1, wherein the plurality of individual controllers are virtual machines, in which a virtual machine for each leaf switch and for each spine switch runs firmware originally configured for systems comprising individual controllers for each leaf switch and spine switch.

3. The system of claim 1, wherein each of the plurality of leaf switches and the plurality of spine switches comprise a switch application-specific integrated circuit.

4. The system of claim 1, wherein the switch manager is connected to the plurality of leaf switches and the plurality of spine switches using a Peripheral Component Interconnect Express bus.

5. A method for managing server switches, comprising:
   connecting a plurality of leaf switches to a switch manager;
   connecting a plurality of spine switches to the switch manager and to each of the plurality of leaf switches; and
   running, on the switch manager, an emulation of a plurality of individual controllers, each of the plurality of leaf switches corresponding to one of the plurality of individual controllers and each of the plurality of spine switches corresponding to another one of the plurality of individual controllers.

6. The method of claim 5, further comprising connecting the plurality of spine switches to each of the plurality of leaf switches.

7. The method of claim 5, further comprising running, on the emulation of the one of the plurality of individual controllers, firmware originally configured for systems comprising individual controllers for each leaf switch.

8. The method of claim 5, further comprising running, on the emulation of the another one of the plurality of individual controllers, firmware originally configured for systems comprising individual controllers for each spine switch.

9. The method of claim 5, wherein the switch manager comprises multiple central processing units.

10. The method of claim 5, wherein each of the plurality of leaf switches and the plurality of spine switches comprise an application specific integrated circuit.

11. The method of claim 5, wherein the switch manager connects to the plurality of leaf switches and the plurality of spine switches using a Peripheral Component Interconnect Express bus.

12. A network system, comprising:
   a plurality of leaf switches;
   a plurality of spine switches connected to each of the plurality of leaf switches; and
   a controller in communication with the plurality of leaf switches and the plurality of spine switches and storing instructions which, when executed, cause the controller to perform operations comprising emulating a plurality of individual controllers, each of the plurality of leaf switches corresponding to one of the plurality of individual controllers and each of the plurality of spine switches corresponding to another one of the plurality of individual controllers.

13. The network system of claim 12, wherein the plurality of individual controllers are virtual machines, in which a virtual machine for each leaf switch and for each spine switch runs firmware originally configured for systems comprising individual controllers for each leaf switch and spine switch.

14. The network system of claim 12, wherein each leaf switch and each spine switch comprise an application-specific integrated circuit.

15. The network system of claim 12, wherein the controller is connected to the plurality of leaf switches and the plurality of spine switches using a Peripheral Component Interconnect Express bus.

* * * * *